Aug. 28, 1934.                C. LE MAY                1,972,022
                             MILLING TOOL
                         Filed July 27, 1931
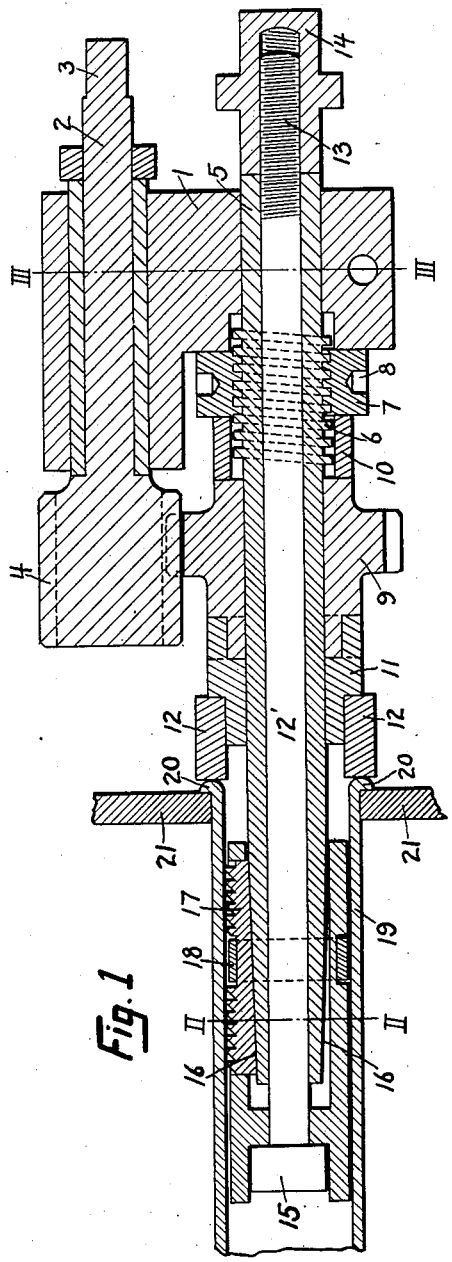
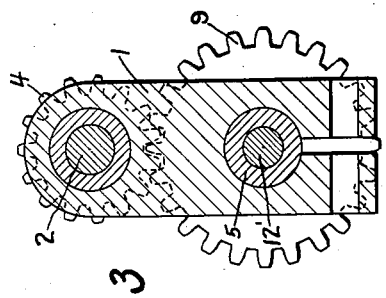
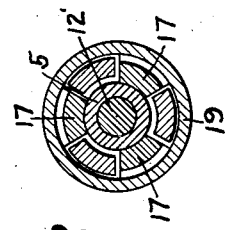
INVENTOR.
C. Le May
BY
       ATTORNEY.

Patented Aug. 28, 1934

1,972,022

UNITED STATES PATENT OFFICE 1,972,022

MILLING TOOL

Clarence Le May, Oklahoma City, Okla.

Application July 27, 1931, Serial No. 553,441

1 Claim. (Cl. 90—12)

The present invention is directed to improvements in portable milling tools.

The primary object of the invention is to provide a device of this kind so constructed that the same can be fixedly connected to a boiler tube or flue and operated to cut the welded bead therefrom when it is desired to replace the tube or flue, or reweld a leaky welded joint.

Another object of the invention is to provide a device of this kind so constructed that it can be easily and quickly attached to or removed from the tube or flue.

Another object of the invention is to provide a device of this nature which is exceedingly simple in construction, durable, efficient in operation, and one which can be manufactured at a small cost.

The invention will now be described in connection with the accompanying drawing, in which:—

Figure 1 is a longitudinal sectional view.

Fig. 2 is a sectional view on the line 2—2 of Fig. 1.

Fig. 3 is a sectional view on the line 3—3 of Fig. 1.

Referring to the drawing, 1 designates a frame in which is journalled the driving shaft 2, said shaft having a head 3 upon one end for engaging a coupling, not shown, which may be driven by a motor, or if desired, a crank handle may be applied to this head. The other end of the shaft 2 carries an elongated pinion 4, the purpose of which will appear later.

Clamped in the frame 1 is a tubular mandrel 5 provided intermediate its ends with threads 6, and engaged with said threads is a feed nut 7 having tool engaging sockets 8 to facilitate the rotation thereof.

Freely journalled on the mandrel in advance of the feed nut is a ring gear 9, the teeth of which mesh with the teeth of the pinion 4, there being a thrust collar 10 interposed between said nut and gear.

The ring gear 9 carries a cutter head 11 having removably mounted therein in any approved manner cutters 12 formed of steel for high speed cutting. Obviously the head 11 will rotate when rotary movement is imparted to the ring gear 9 through the medium of the shaft 2.

Slidable in the mandrel 5 is a slip rod 12' having its rear end provided with threads 13 for the reception of the adjusting nut 14 which bears at its rear end against the adjacent end of the mandrel. The forward end of the slip rod 12' is provided with a head 15, the purpose of which will later appear.

The mandrel is formed with tapered flat faces 16, preferably three in number and upon which the correspondingly shaped inner faces of the slips 17 engage. The slips are retained on the mandrel by a collar 18.

The device is shown in its operative position in Fig. 1, the boiler tube or flue being designated by the numeral 19 and the welded bead by the numeral 20, which are formed in the customary manner to secure the ends of the tube or flue to the boiler sheet or head 21.

Briefly, the operation is as follows: The mandrel is inserted in the end of the tube after which the nut 14 is rotated clockwise which draws the slip rod 12' outwardly, whereupon the coacting tapered faces of the slips and mandrel will expand the slips and cause the teeth thereof to grip the inner wall of the tube or flue. It will be obvious that the head 15 when moved outwardly will cause the slips to ride upon the tapered faces 15, thus causing the teeth of the slips to bite into the tube, thereby holding the device firmly in place for the milling operation.

Power is then applied to the shaft 2 to drive the ring gear 9 and thus the cutter head 11, whereupon the cutters will mill the bead. During rotation of the head 11 the nut 7 is manipulated to feed the ring gear forwardly upon the mandrel in order that the cutters 12 will move forwardly as the weld is cut.

What is claimed is:—

A milling tool comprising a frame, a tubular mandrel clamped in the frame, a feed nut threaded on the mandrel, a ring gear rotatable on the mandrel, a drive shaft rotatably supported by the frame and having a pinion thereon adapted to mesh with the ring gear and being slidable with respect thereto, said ring gear having a cutter head carried thereby, cutters carried by the head and alined axially with the mandrel, said mandrel having inclined faces thereon, toothed slips slidable on the inclined faces, a slip rod slidable in the mandrel and having a head upon one end for engaging the slips to expand the same when the slip rod is moved in one direction, and a nut threaded on the other end of the slip rod and bearing against the mandrel, said nut being adapted when rotated in one direction to exert a thrust upon the mandrel to slide the slip rod to impart radial movement to the slips, as and for the purpose set forth.

CLARENCE LE MAY.